US 6,749,105 B2

(12) United States Patent
Wang et al.

(10) Patent No.: US 6,749,105 B2
(45) Date of Patent: *Jun. 15, 2004

(54) METHOD AND APPARATUS FOR SECURING A METALLIC SUBSTRATE TO A METALLIC HOUSING

(75) Inventors: Ying Wang, Wheeling, IL (US); Thomas P. Gall, Northbrook, IL (US)

(73) Assignee: Motorola, Inc., Schaumburg, IL (US)

( * ) Notice: Subject to any disclaimer, the term of this patent is extended or adjusted under 35 U.S.C. 154(b) by 28 days.

This patent is subject to a terminal disclaimer.

(21) Appl. No.: 10/103,590

(22) Filed: Mar. 21, 2002

(65) Prior Publication Data

US 2003/0178217 A1 Sep. 25, 2003

(51) Int. Cl.[7] .................... B23K 1/20; B23K 31/02; B23K 20/16; B23K 20/22; B23K 35/24
(52) U.S. Cl. .................... 228/262.51; 228/208; 228/245
(58) Field of Search .............. 228/262.1, 262.5–262.51, 228/124.6, 208, 245, 248.1

(56) References Cited

U.S. PATENT DOCUMENTS

| | | | |
|---|---|---|---|
| 3,586,926 A | * | 6/1971 | Nakamura et al. .......... 257/682 |
| 3,675,310 A | * | 7/1972 | Schwaneke et al. ........ 228/205 |
| 3,811,030 A | * | 5/1974 | Veach ........................ 219/237 |
| 3,855,679 A | * | 12/1974 | Schmatz ..................... 428/643 |
| 4,082,394 A | | 4/1978 | Gedney et al. |
| 4,338,486 A | * | 7/1982 | Mucke ...................... 174/52.5 |
| 4,434,134 A | | 2/1984 | Darrow et al. |
| 4,486,622 A | * | 12/1984 | Dathe et al. ............... 174/52.5 |
| 4,598,470 A | | 7/1986 | Dougherty, Jr. et al. |
| 4,784,974 A | * | 11/1988 | Butt ............................ 29/827 |
| 4,954,313 A | | 9/1990 | Lynch |
| 5,030,499 A | | 7/1991 | Shaheen et al. |
| 5,080,958 A | | 1/1992 | Patterson et al. |
| 5,101,322 A | | 3/1992 | Ghaem et al. |
| 5,123,164 A | | 6/1992 | Shaheen et al. |
| 5,155,299 A | * | 10/1992 | Mahulikar et al. ......... 174/52.4 |
| 5,170,245 A | | 12/1992 | Kim et al. |
| 5,216,581 A | | 6/1993 | Fisher et al. |
| 5,265,322 A | | 11/1993 | Fisher et al. |
| 5,315,155 A | * | 5/1994 | O'Donnelly et al. ........ 257/711 |
| 5,316,787 A | | 5/1994 | Frankeny et al. |
| 5,332,695 A | * | 7/1994 | Shigihara et al. ........... 438/122 |
| 5,435,480 A | | 7/1995 | Hart et al. |
| H1471 H | | 8/1995 | Braun et al. |
| 5,507,499 A | * | 4/1996 | Davenport et al. ......... 277/312 |
| 5,526,867 A | * | 6/1996 | Keck et al. .................... 164/97 |
| 5,640,761 A | | 6/1997 | DiStefano et al. |
| 5,671,802 A | * | 9/1997 | Rogers ........................ 165/41 |
| 5,708,566 A | * | 1/1998 | Hunninghaus et al. ...... 361/704 |
| 5,715,595 A | | 2/1998 | Kman et al. |
| 5,894,054 A | | 4/1999 | Paruchuri et al. |
| 5,957,547 A | * | 9/1999 | Schliebe et al. ......... 303/119.3 |
| 6,037,539 A | | 3/2000 | Kilgo et al. |
| 6,114,098 A | | 9/2000 | Appelt et al. |
| 6,129,262 A | | 10/2000 | Cooper et al. |
| 6,244,497 B1 | | 6/2001 | Conn et al. |
| 6,264,096 B1 | | 7/2001 | Belt et al. |
| 6,449,158 B1 | * | 9/2002 | Wang et al. ................. 361/704 |
| 6,497,026 B1 | * | 12/2002 | Traver et al. ............. 29/402.08 |

FOREIGN PATENT DOCUMENTS

EP 0 411 551 A2 7/1990

* cited by examiner

Primary Examiner—Tom Dunn
Assistant Examiner—Colleen P. Cooke
(74) Attorney, Agent, or Firm—Thomas V. Miller

(57) ABSTRACT

A method for securing a metallic substrate (24) to a metallic housing (26). The method may include: firing a first solderable coating (64) to an edge (60) of the metallic substrate (24); firing a second solderable coating (64) to a groove (62) of the metallic housing (26); joining the edge (60) of the metallic substrate (24) to the groove (62) of the metallic housing (26) to form a joint (66) at the first solderable coating and the second solderable coating; applying a solder (68) to the joint (66); and solder bonding the metallic substrate (24) to the metallic housing (26) to provide a hermetic seal at the joint (66). There is also an electronic control module that incorporates the method.

13 Claims, 6 Drawing Sheets

METHOD AND APPARATUS FOR SECURING A METALLIC SUBSTRATE TO A METALLIC HOUSING

CROSS-REFERENCE TO RELATED APPLICATION

This application is related to the following co-pending and commonly assigned patent application, which is hereby incorporated by reference herein: application Ser. No. 10/103,084, entitled "Method and Apparatus for Securing an Electrically Conductive Interconnect Through a Metallic Substrate," filed on same date herewith, by Stanton F. Rak and Ying Wang, attorney's docket number AP01992.

FIELD OF THE INVENTION

This invention in general relates to metallic substrates and metallic housings and, more particularly, to a method and apparatus for securing a metallic substrate to a metallic housing to provide a hermetic seal.

BACKGROUND OF THE INVENTION

Engine mounted electronic control modules for vehicular engines are subject to a high level of heat and vibration. In these applications, electronic components and circuits are formed on a metallic substrate that typically needs to be enclosed within a hermetically sealed metallic housing. In the past, it has been costly to provide a hermetic seal at the joints of the electronic control module.

Aluminum is a preferred material used for metallic substrates and metallic housings for electronic control modules. Aluminum is cheaper than other metals and has a high thermal conductivity needed in automobile environments.

In assembling the metallic substrate and metallic housing, it has been known to use mechanical fasteners such as screws. However, this does not provide a hermetic seal.

Prior attempts at creating a hermetic seal have included plating, brazing or welding the aluminum surface with a metal layer such as zinc, copper or nickel. The cost for plating and welding, however, is expensive because it requires the use of plating and welding equipment. Additionally, the plating quality is very sensitive to the surface condition of the aluminum. The quality of welding is very sensitive to the gap distance at the joint or seam line between the pieces. Further, aluminum-brazing methods typically require inert atmosphere to operate.

It is also known to use special soldering processes suitable for aluminum, including high temperature solder and special fluxes. The cost involved in these applications, however, are also high because of the need for high soldering temperatures and special fluxes.

It is further known to use organic materials such as adhesives. The use of organic materials, however, may create weaker joints than a soldering connection. Additionally, known uses of organic materials is limited because they do not provide a hermetic seal. Further, the dispensing and curing of the organic materials complicates the production flow and adds more cost.

In sum, current devices and methods to join aluminum pieces are costly. Accordingly, there is a need for improved ways to provide an approach that reduces the complexity of the manufacturing process and reduces costs. This is especially important in high volume applications such as electronic control modules for vehicles. It is, therefore, desirable to provide an improved device and method of securing a metallic substrate to a metallic housing to overcome most, if not all, of the preceding problems.

Figure 1:
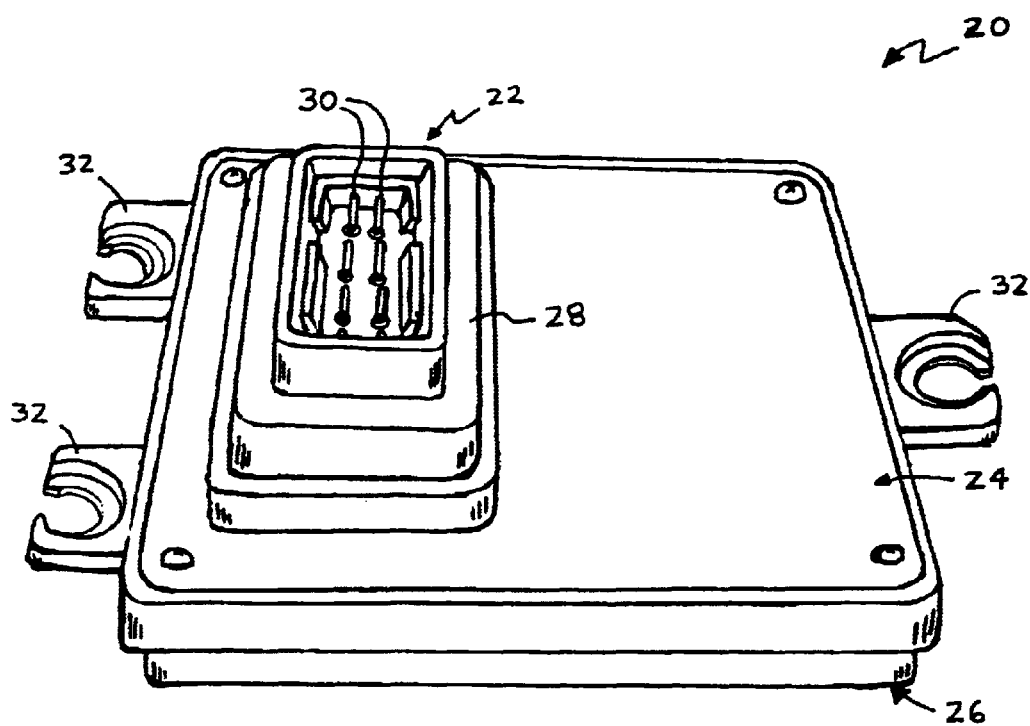
FIG. 1 is a perspective view of an electronic control module according to one embodiment of the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DETAILED DESCRIPTION

What is described is a method and apparatus for securing a metallic substrate to a metallic housing to provide a hermetic seal. For purposes of illustration, an example of the method and apparatus will be described in the context of a hermetically sealed electronic control module for a vehicle. However, the present invention is not limited to modules for vehicles but may also apply to other housings or devices where a hermetic seal is needed.

To this end, generally, in one embodiment there is a method for securing a first aluminum piece to a second aluminum piece. The first aluminum piece may be a metallic substrate and the second aluminum piece may be a metallic housing. The method may include: firing a first solderable coating to an edge of the first aluminum piece; firing a second solderable coating to a portion of the second aluminum piece; joining the first aluminum piece to the second aluminum piece to form a joint at the first solderable coating and the second solderable coating; applying a solder to the joint; solder bonding the first aluminum piece to the second aluminum piece to provide a hermetic seal at the joint.

In another embodiment there is a method for securing a metallic substrate to a metallic housing. The method may include: firing a first solderable coating to an edge of the metallic substrate; firing a second solderable coating to a groove of the metallic housing; joining the edge of the metallic substrate to the groove of the metallic housing to form a joint at the first solderable coating and the second solderable coating; applying a solder to the joint; and solder bonding the metallic substrate to the metallic housing to provide a hermetic seal at the joint.

In a further embodiment, there is an electronic control module for a vehicle that includes a metallic substrate and a metallic housing. The metallic substrate is used for mounting the electronic components and has an outer edge. The metallic housing has an outer groove to house the electronic components mounted on the metallic substrate. The electronic control module further has a means for securing the outer edge of the metallic substrate to the outer groove of the metallic housing to provide a hermetic seal. The means includes at least firing a first solderable coating on the outer edge of the metallic substrate and firing a second solderable coating on the outer groove of the metallic housing.

Now, turning to the drawings, an example electronic control module will be explained. FIG. 1 shows an electronic control module 20. In one embodiment, generally, the electronic control module 20 has a connector 22, a metallic substrate 24, and a module housing 26.

The connector 22 includes a connector housing 28 and a plurality of electrically conductive interconnects 30. The electrically conductive interconnects 30 may take a variety of forms but, in one embodiment, may be cylindrical metallic pins.

The substrate 24 is made of a metallic material. In one embodiment, the substrate 24 is made of aluminum. Aluminum is less expensive than other metallic materials and is a good conductor of heat that is important for automobile applications. The metallic substrate 24 is used for mounting the components and other circuitry for the electronic control module 20.

The module housing 26 is also made of a metallic material such as aluminum. The module housing 26 is attached to the substrate 24 to define an internally hermetically sealed cavity to store the components and other circuitry for the electronic control module 20. For automobile uses, the module housing 26 may also have outwardly extending flanges 32 to mount the electronic control module 20 to an automobile (not shown).

Figure 2:
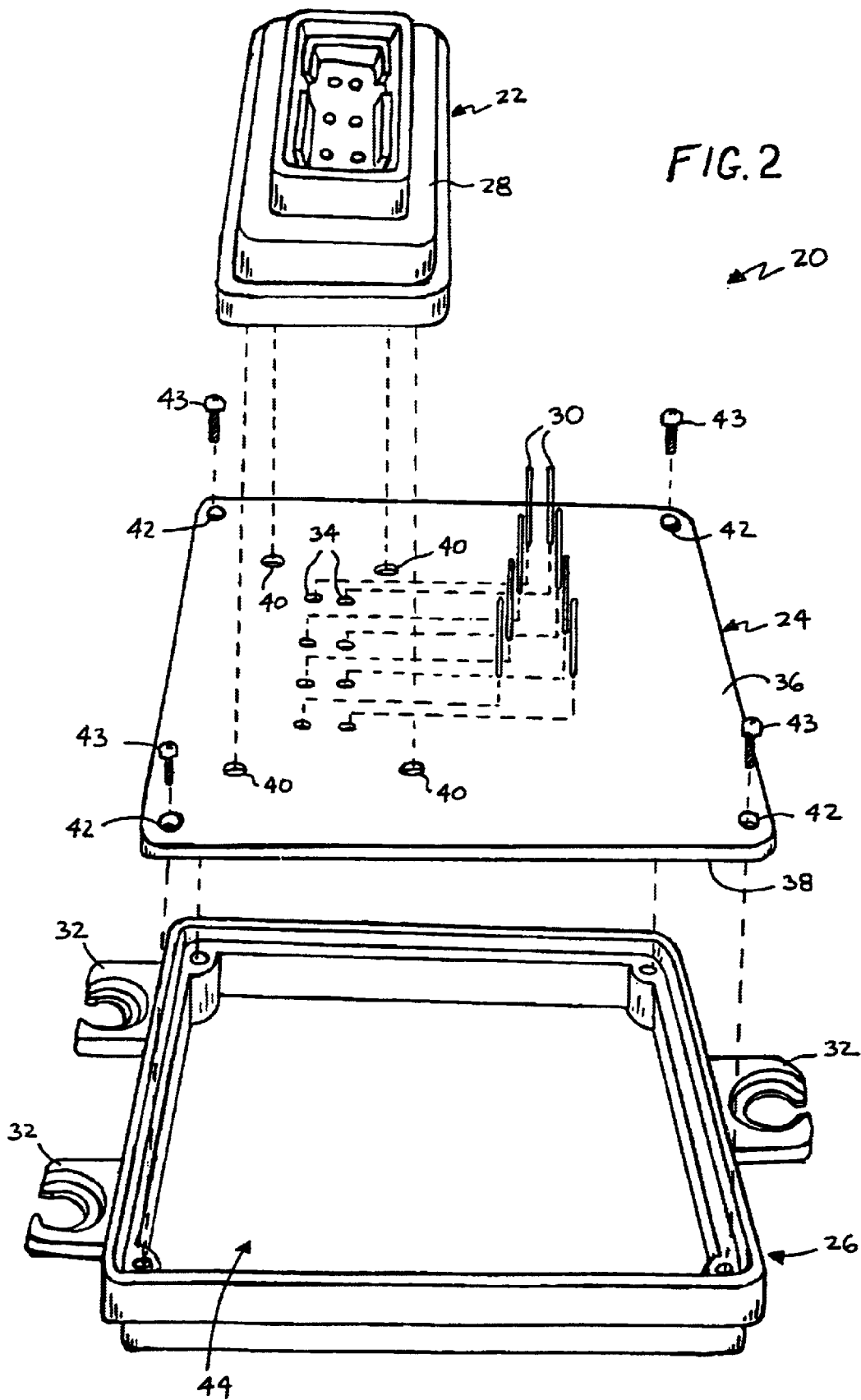
FIG. 2 is an exploded view of the electronic control module in FIG. 1.

FIG. 2 illustrates an exploded view of the electronic control module 20 shown in FIG. 1. In one embodiment, the metallic substrate 24 has a plurality of interconnect holes 34, a first surface 36, and a second surface 38. The metallic substrate 24 may further have holes 40 for connecting the connector housing 28 to the first surface 36 of the metallic substrate 24 by the use of mechanical fasteners such as screws 41 (shown in FIG. 3).

The metallic substrate 24 may further have other holes 42 for connecting metallic substrate 24 to the module housing 26 by the use of mechanical fasteners such as screws 43. A further method is described in more detail below for attaching the metallic substrate 24 to the module housing 26 to provide a hermetic seal. The metallic substrate 24 and the module housing 26 may then define a hermetically sealed internal cavity 44.

Figure 3:
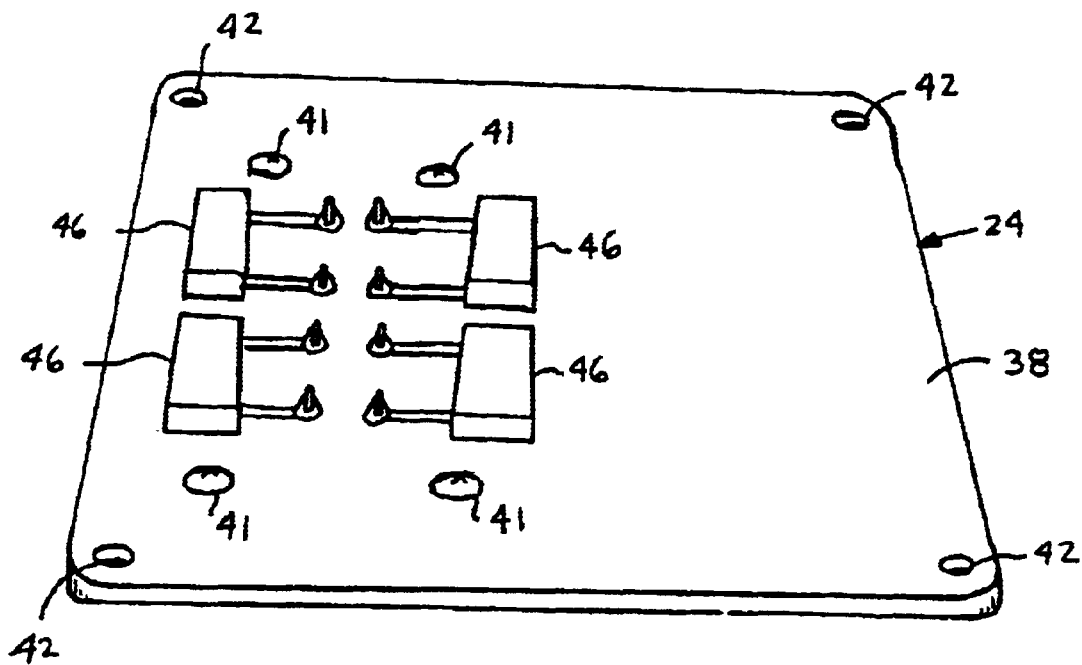
FIG. 3 is a perspective view of a metallic substrate.

FIG. 3 illustrates a perspective view of the second surface 38 of the metallic substrate 24. The second surface 38 of the metallic substrate 24 is used for mounting components 46 and other circuitry of the electronic control module 20 within the sealed internal cavity 44. The exact components and circuitry are implementation specific but may include devices such as transistors, processors, and memory. As those of ordinary skill will appreciate, the method and device described herein eliminates the need for wire bonds to connect the interconnects 30 to the components 46 and other circuitry. Thus, the manufacturing process is less complex and the assembly costs are reduced.

As illustrated in FIG. 2, each of the plurality of electrically conductive interconnects 30 extend through a separate interconnect hole 34 in the metallic substrate 24. As illustrated in FIG. 3, each of the electrically conductive interconnects 30 are attached to the metallic substrate 24. In particular, as will be explained in more detail below, the interconnects 30 are attached to an electrically insulating layer of the metallic substrate 24 by a solderable coating and a solder.

Figure 4A:
FIGS. 4A–4F are cross-sectional views of a metallic substrate illustrating one embodiment of a method to form an interconnect through the metallic substrate.

FIGS. 4A–4F illustrate a suitable method for securing the electrically conductive interconnects 30 to the metallic substrate 24. FIG. 4A is a cross sectional view of a single sheet of metallic substrate 24. As mentioned above, the metallic substrate 24 has a first surface 36 and a second surface 38.

Figure 4B:
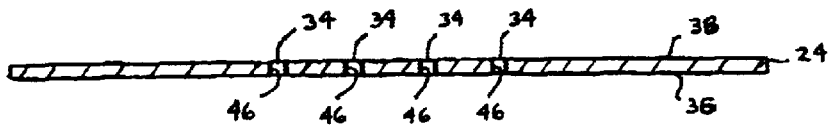

As shown in FIG. 4B, the method further includes forming a plurality of interconnect holes 34 in the metallic substrate 24. Each interconnect hole 34 is defined by an internal surface 46 of the metallic substrate 24 that extends from the first surface 36 to the second surface 38. The width of the interconnect holes 34 is slightly larger than the width of the interconnects 30 and the geometric shape of the interconnect holes 34 is preferably the same as the interconnects 30.

Figure 4C:
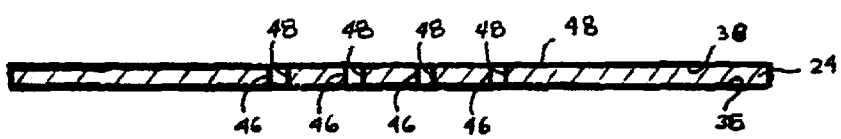

As shown in FIG. 4C, the method further includes applying an electrically insulating layer 48 to the metallic substrate 24 including at least the first surface 36, the second surface 38, and the internal surface 46. In one embodiment, where the metallic substrate 24 is made of aluminum, the insulating layer 48 is an oxidation layer formed through an anodization process. Anodization in this case then will provide the dielectric between the interconnects 30 and the metallic substrate 24.

Figure 4D:
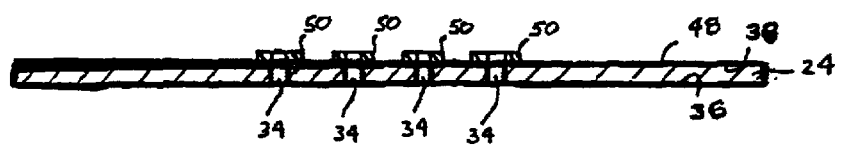

As shown in FIG. 4D, the method further includes applying, by firing or curing, a solderable coating 50 to at least a portion of the insulating layer 48 on the second surface 38 of the metallic substrate 24. The solderable coating 50 may be applied around each interconnect hole 34. The solderable coating 50 may also run inside each interconnect hole 34. This step is necessary when the insulating layer 48 is not practically solderable. For example, solder will not adhere to anodized aluminum. Therefore, a solderable coating 50 is applied to the metallic substrate 24.

A suitable solderable coating 50 is a high temperature processed glass filled ink, such as Ferro 3350 from Ferro Corporation, that is fired by being exposed to a temperature of approximately 600° C. for approximately 5 minutes. The high temperature processed glass is preferably one that contains one or more of silver and copper. This allows the solderable coating 50 to also serve as the electrically conductive traces that run between the interconnects 30 and the components 46. In another embodiment, the solderable coating 50 may be a low temperature processed organic material, such as Dynaloy 350 from Dynaloy, Inc., that is cured by being exposed to a temperature of approximately 150° C. for approximately 10 minutes. Applying a solderable coating 50 to a portion of the insulation layer 48 permits the securing of the interconnects 30 to the metallic substrate 24.

Figure 4E:
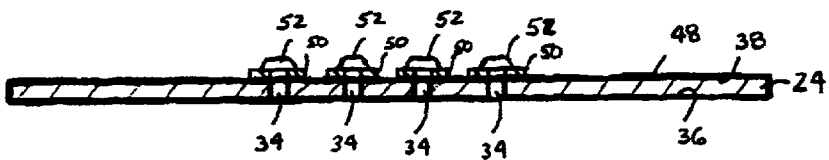

As shown in FIG. 4E, the method further includes applying a solder 52 to at least a portion of the solderable coating 50 at or above each interconnect hole 34. The solder 52 is used to bond the interconnects 30 to the metallic substrate 24 within the interconnect holes 34. The solder 52 may be a solder paste that is preferably screened onto the portion of the solderable coating 50.

Figure 4F:
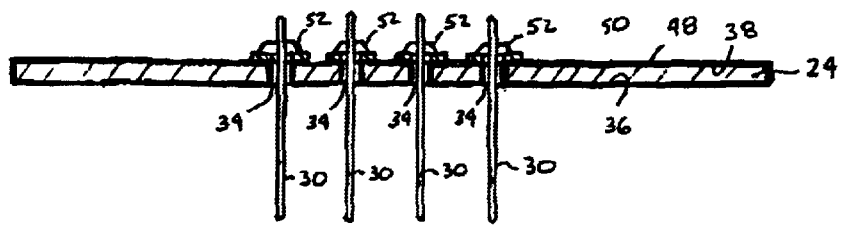

As shown in FIG. 4F, the method further includes inserting an interconnect 30 within each interconnect hole 34 so that the interconnect 30 comes in contact with the solder 52. In one embodiment, this is done by inserting the interconnects 30 from the first surface 36 of the metallic substrate 24. Thereafter, the interconnects 30 are solder bonded to the metallic substrate 24. This may be done by reflowing solder paste in a reflow oven.

The above steps may be done by a mechanical process or in connection with an automated pick-and-place machine.

As seen in the process described in FIGS. 4A–4F, the use of wire bonds is eliminated which reduces the complexity of the assembly process. The electrically conductive traces of the circuitry running to the components 46 may be directly masked onto the insulated metallic substrate 24 and to the interconnects 30. Additionally, no special plating is required on the metallic substrate 24. Moreover, the process steps described above utilize conventional methods such that special equipment is not necessary.

Further, a hermetic seal is provided at each of the interconnect holes 34 after the processing steps. The interconnect holes 34 are sealed by the solderable coating 50 and solder 52. This is of particular interest in automotive applications where the electronic control module 20 typically needs to be hermetically sealed. The benefit of the present invention is that it permits the use of small through holes in the metallic substrate 24. Thus, the overall area for leaks is severely reduced.

Figure 5A:
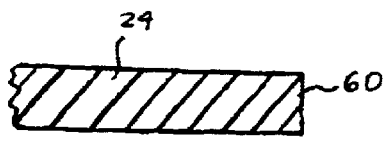
FIGS. 5A–C are cross-sectional views of a metallic substrate and housing illustrating one embodiment of a method of the present invention that attaches the metallic substrate to the housing.
Figure 5A:
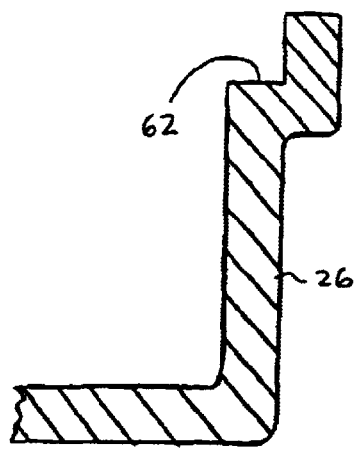
Figure 5B:
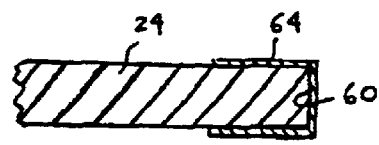
Figure 5B:
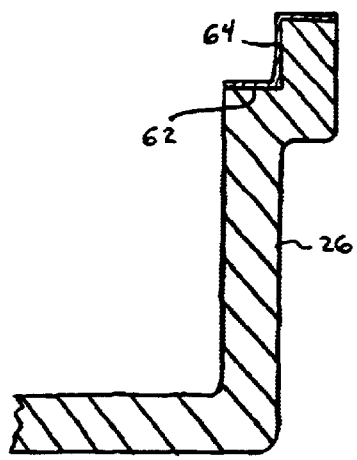
Figure 5C:
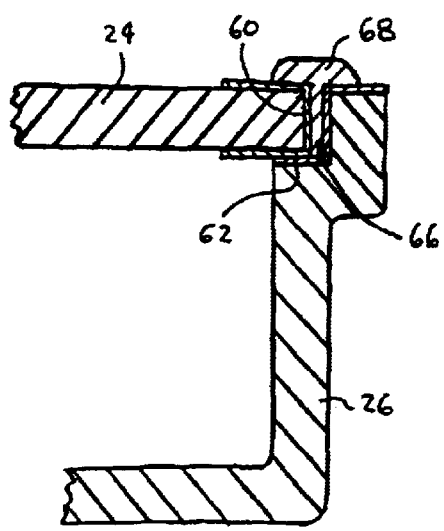

To further aid in providing a hermetically sealed module, FIGS. 5A–5C illustrate a method for securing the metallic substrate 24 to the module housing 26. In one embodiment, the metallic substrate 24 is a relatively flat piece of metal as shown in FIG. 5A. An outer edge 60 of the metallic substrate 24 is mated with a groove 62 formed in the module housing 26.

It is preferable to use soldering methods for attaching the metallic substrate 24 to the module housing 26. Soldering methods are cheaper than welding and other known methods. Solder, however, will not bond directly to thermally conductive metallic materials such as aluminum. Accordingly, a new way to permit soldering has been found to take advantage of lower cost assembly methods.

To permit soldering in this application, as shown in FIG. 5B, the method includes applying, by firing, a solderable coating 64 to at least a portion of the outer edge 60 of the metallic substrate 24 and to at least a portion of the groove 62 of the module housing 26. This step is necessary when the metallic pieces to be attached are not practically solderable.

A suitable solderable coating 64 is a high temperature processed glass filled ink, such as Ferro 3350 from Ferro Corporation, that is fired by being exposed to a temperature of approximately 600° C. for approximately 5 minutes. The high temperature processed glass is preferably one that contains one or more of silver and copper. Applying a solderable coating 64 to the portion of the outer edge 60 of the metallic substrate 24 and to the portion of the groove 62 of the module housing 26 permits the securing of the metallic substrate 24 to the module housing 26.

In one embodiment, the method may further include a step of applying an outer insulating layer (not shown) to the metallic substrate 24 and the module housing 26 prior to the step of applying, or firing, the solderable coating 64. Similar to the process described above, if the material used for the metallic substrate 24 and the module housing 26 is aluminum, the insulating layer may be an oxidation layer that formed through an anodization process.

As shown in FIG. 5C, the outer edge 60 of the metallic substrate 24 is joined with the groove 62 of the module housing 26 to form a joint 66. The method further includes applying a solder 68 at the joint 66 between a portion of the outer edge 60 of the metallic substrate 24 and a portion of the groove 62 of the module housing 26. The solder 68 is used to bond the metallic substrate 24 and the module housing 26. The solder 68 will also form a hermetic seal for the electronic control module 20. The solder 68 may be a solder paste that is preferably screened onto the portion of the solderable coating 64. Thereafter, the joint 66 may be solder bonded by reflowing solder paste of the solder 68 in a reflow oven.

Figure 6A:
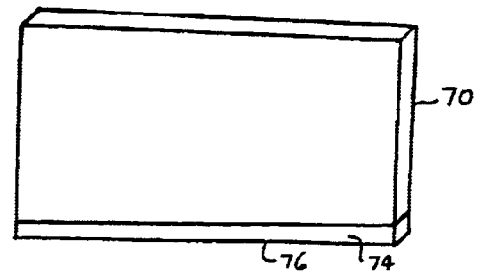
FIGS. 6A–6C are perspective views of two metallic pieces illustrating another embodiment of a method of the present invention that attaches together the metallic pieces.
Figure 6A:
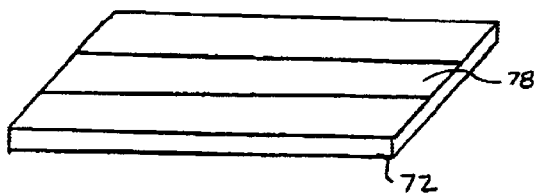
Figure 6B:
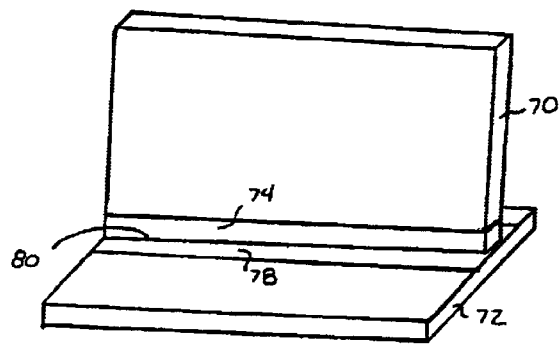
Figure 6C:
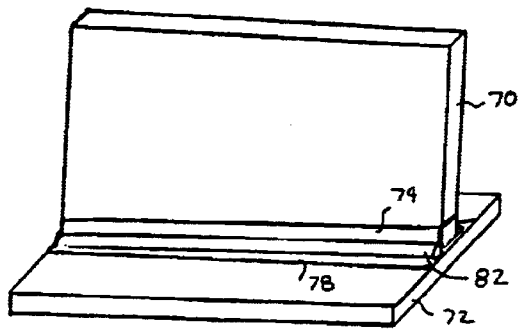
Figure 1:
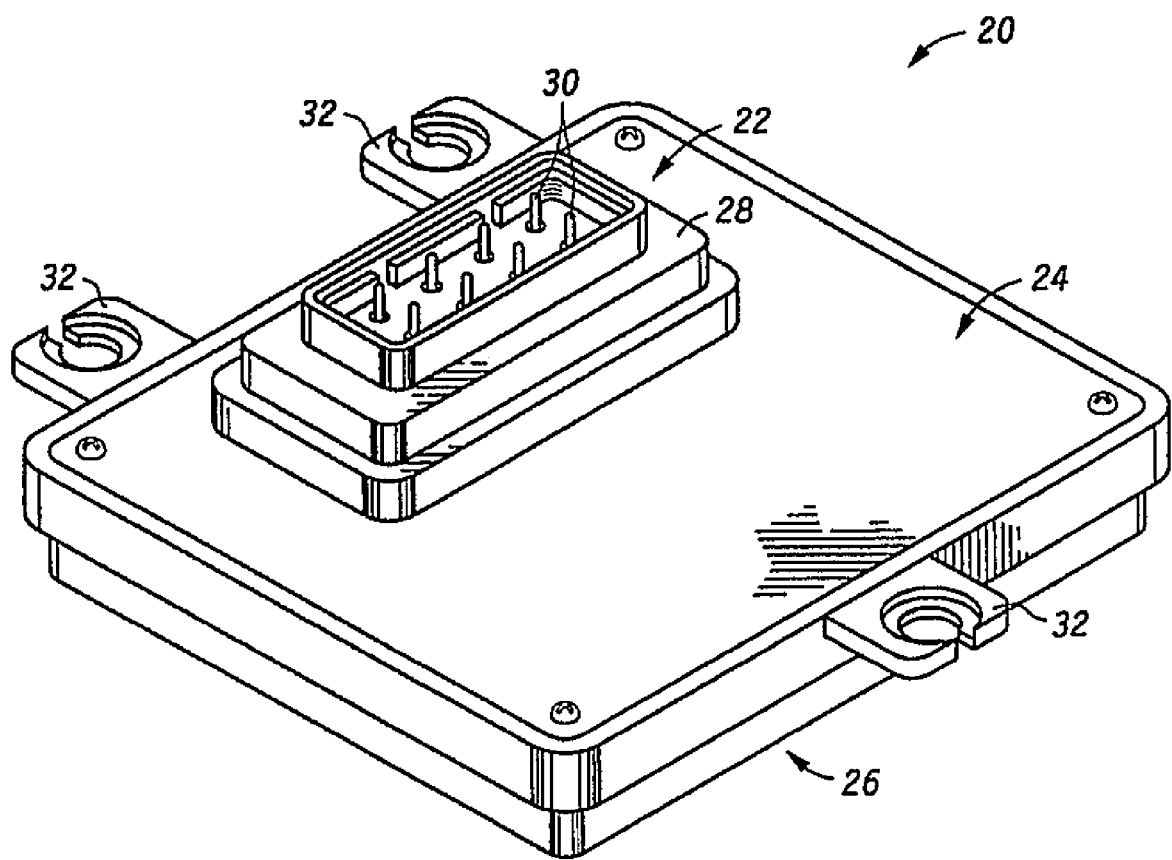
Figure 2:
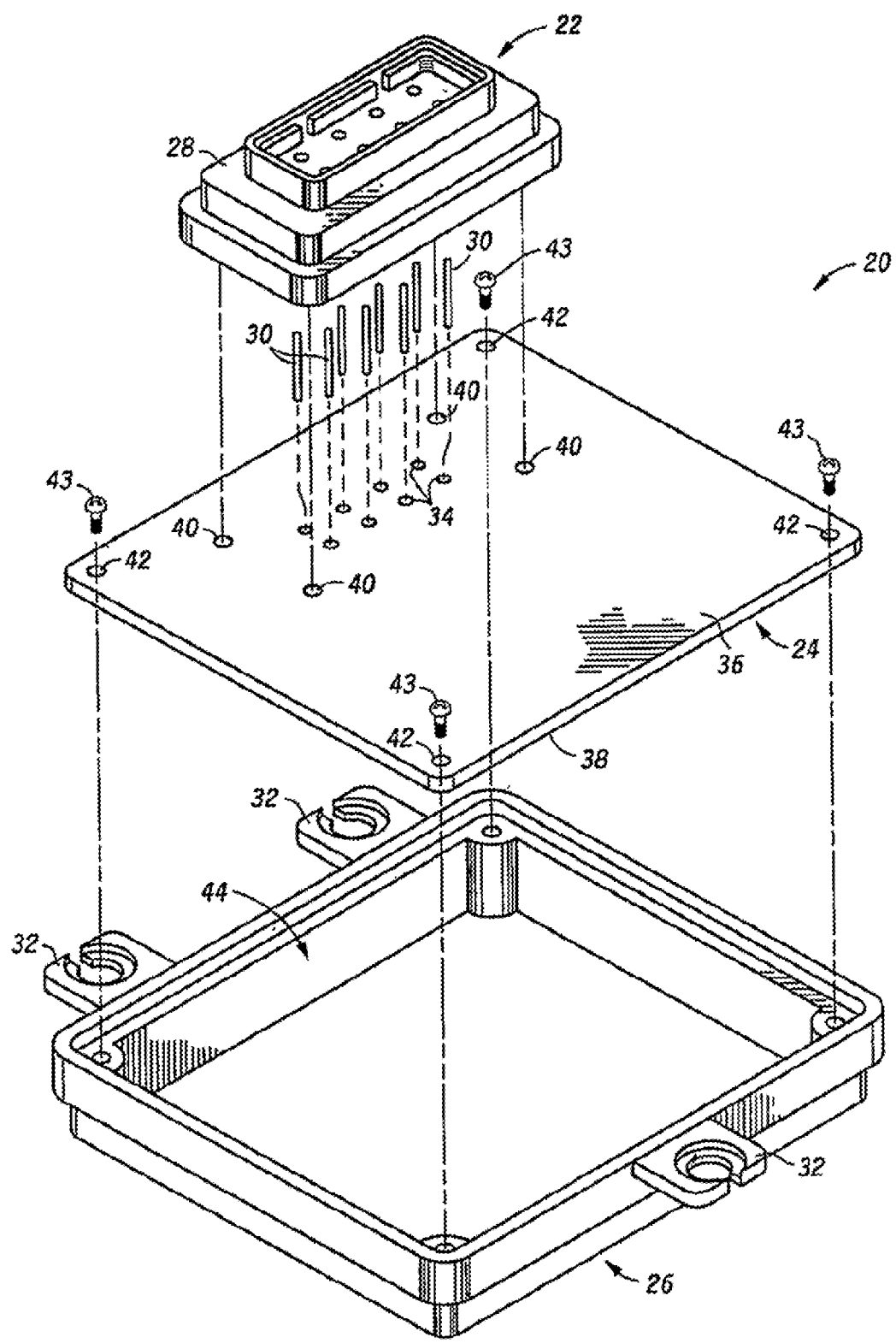
Figure 3:
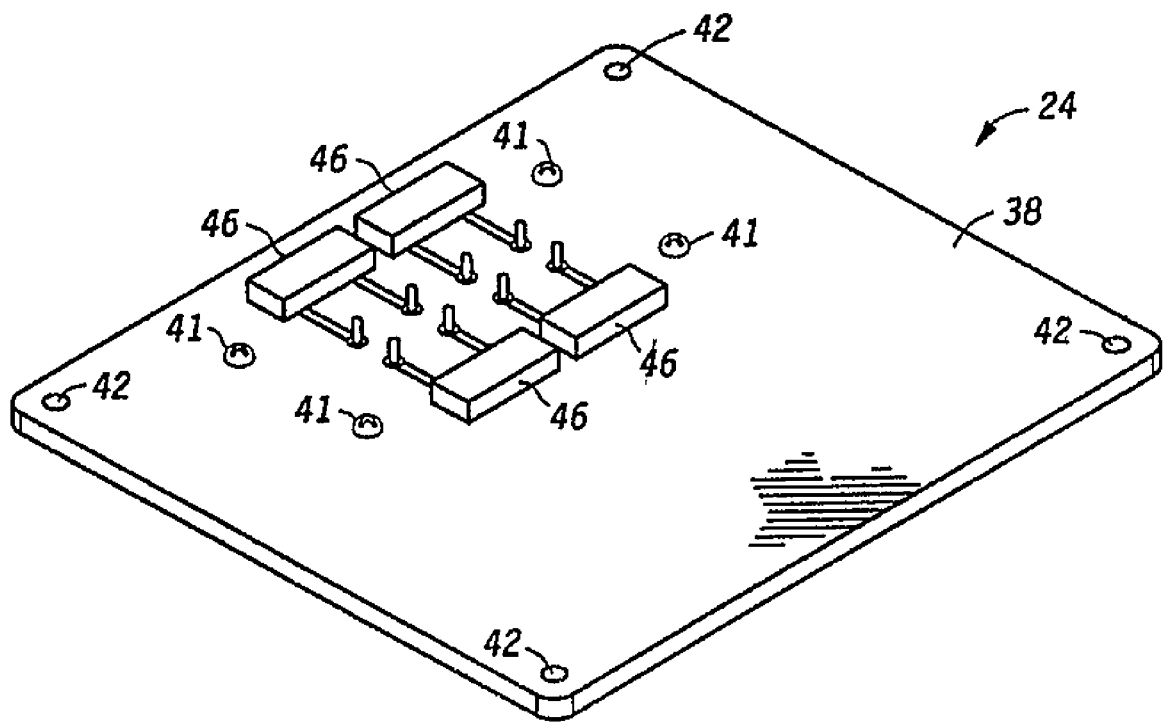
Figure 4A:
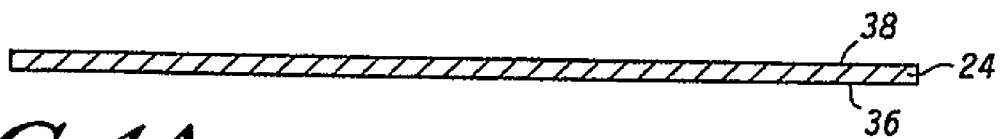
Figure 4B:
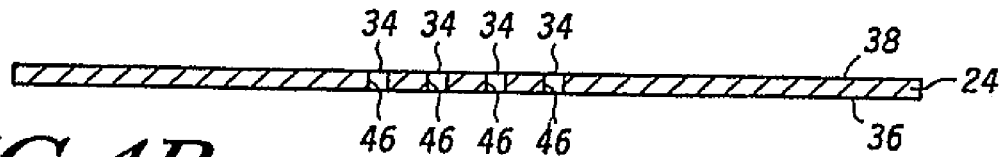
Figure 4C:
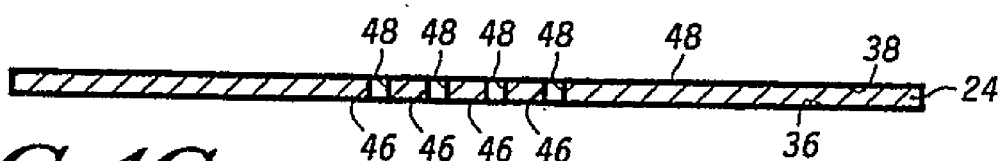
Figure 4D:
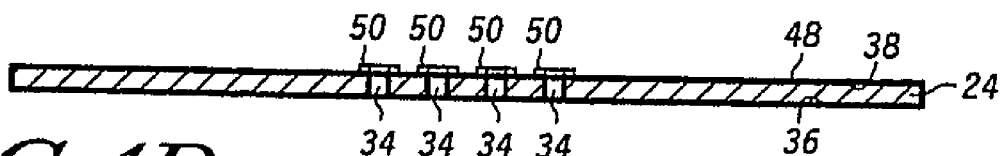
Figure 4E:
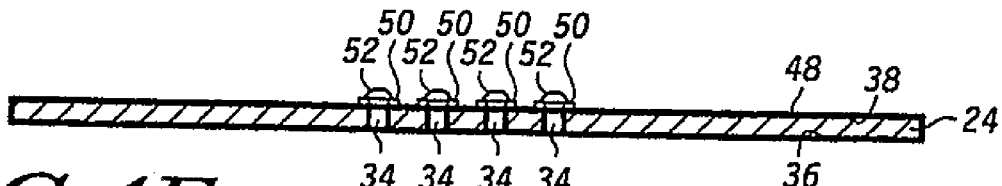
Figure 4F:
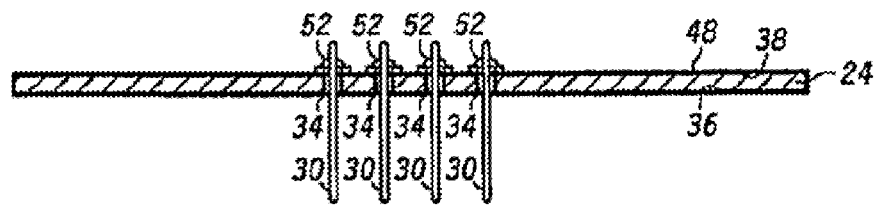
Figure 5A:
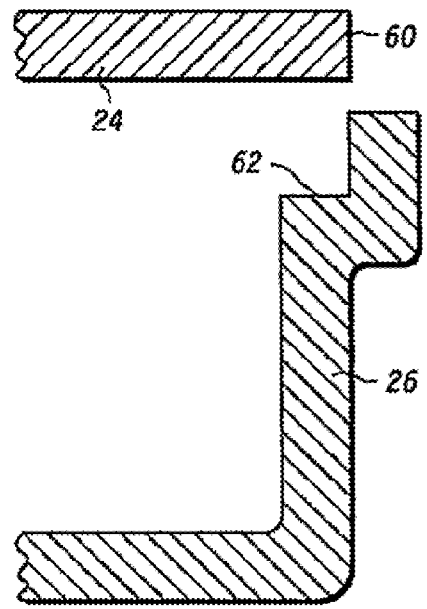
Figure 5B:
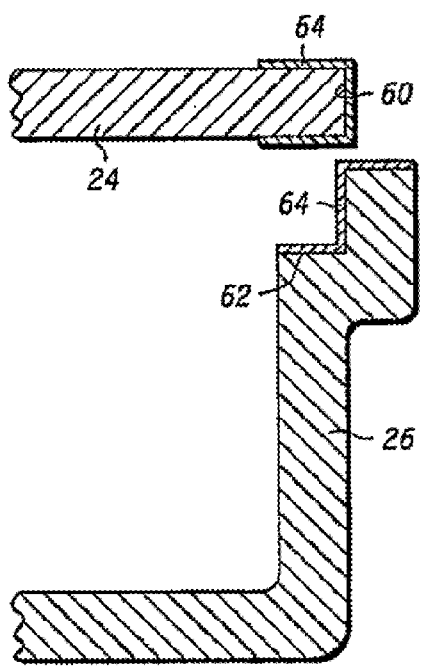
Figure 5C:
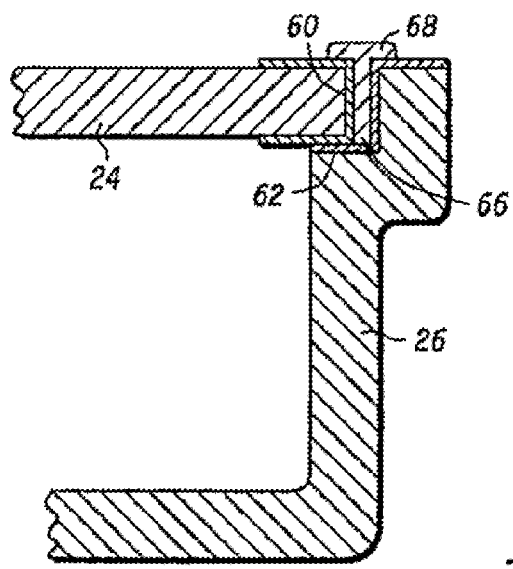
Figure 6A:
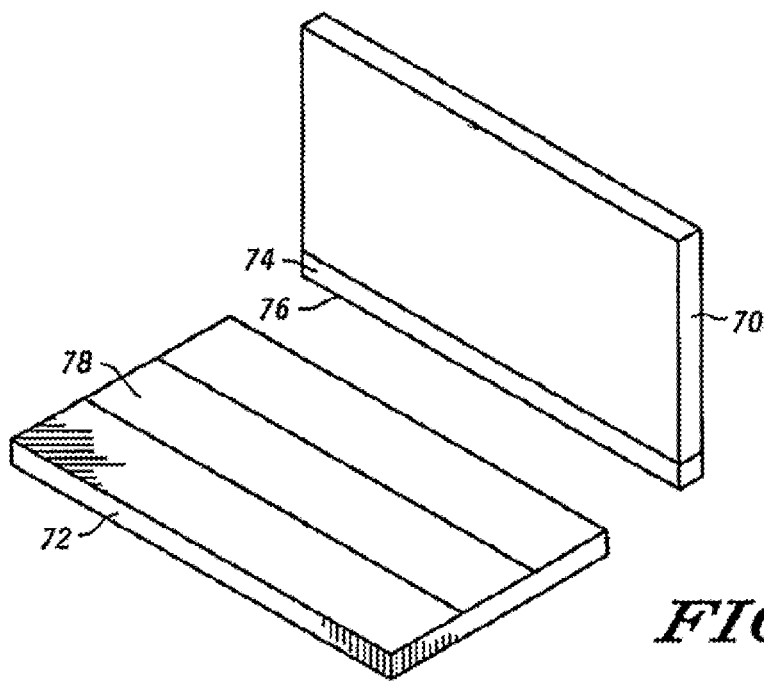
Figure 6B:
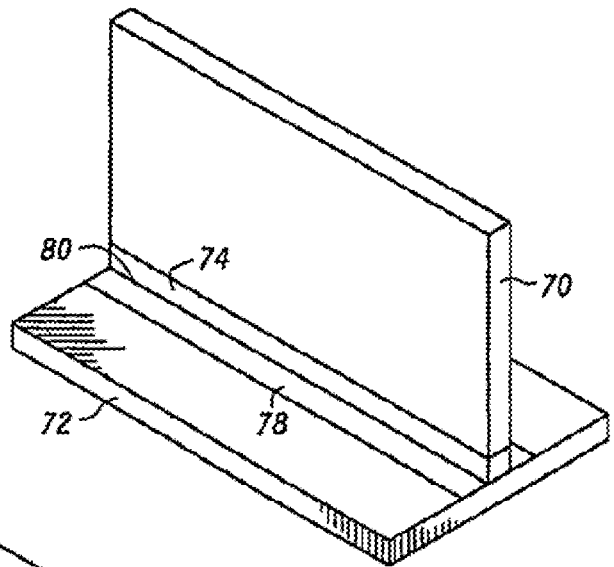
Figure 6C:
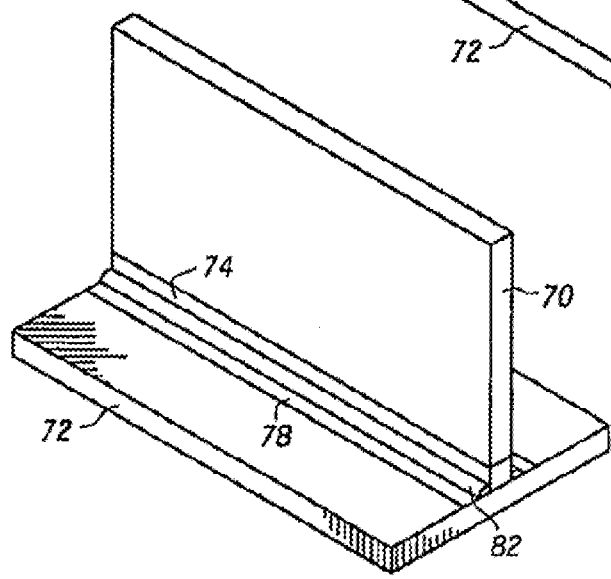

FIGS. 5A–5C illustrate an embodiment for providing a hermetic seal between a metallic substrate 24 and a metallic housing 26. The metallic pieces may take a variety of shapes and hermetic seals may be needed for other applications to take advantage of the cost savings in using a soldering process. Again, soldering methods are cheaper than welding and other known methods. Solder, however, will not bond directly to thermally conductive metallic materials such as aluminum. Accordingly, in a further embodiment that is illustrated in FIGS. 6A–6C, a hermetically seal can be obtained when securing a first aluminum piece 70 to a second aluminum piece 72. In one embodiment, the aluminum pieces 70, 72 are relatively flat pieces.

To permit soldering in this application, as shown in FIG. 6A, the method includes applying, by firing, a first solderable coating 74 to at least a portion of an outer edge 76 of the first aluminum piece 70. The method further includes applying, by firing, a second solderable coating 78 to at least a portion of the second aluminum piece. This step is needed because aluminum pieces are not practically solderable.

Suitable solderable coatings 74, 78 are a high temperature processed glass filled ink, such as Ferro 3350 from Ferro Corporation, that is fired by being exposed to a temperature of approximately 600° C. for approximately 5 minutes. The high temperature processed glass is preferably one that contains one or more of silver and copper. Applying the solderable coatings 74, 78 permits the securing of the first aluminum piece 70 to the second aluminum piece 72.

In one embodiment, the method may further include a step of applying an outer insulating layer (not shown) to the first aluminum piece 70 and the second aluminum piece 72 prior to the step of applying the solderable coatings 74, 78. Similar to the process described above, the insulating layer may be an oxidation layer that formed through an anodization process.

As shown in FIG. 6B, the outer edge 76 of the first aluminum piece 70 is joined with the second aluminum piece to form a joint 80. In FIG. 6C, the method further includes applying a solder 82 at the joint 80 between the first aluminum piece 70 and the second aluminum piece 72. The solder 82 is used to bond the first aluminum piece 70 and the second aluminum piece 72. The solder 82 will also form a hermetic seal at the joint 80. The solder 82 may be a solder paste that is preferably screened onto the portion of the solderable coatings 74, 78. Thereafter, the joint 80 may be solder bonded by reflowing solder paste of the solder 82 in a reflow oven.

What has been described is a method and apparatus for securing a metallic substrate to a metallic housing to provide a hermetic seal. The present invention permits the use of less costly assembly methods that can be of particular interest in high volume production.

The above description of the present invention is intended to be exemplary only and is not intended to limit the scope of any patent issuing from this application. For example, the present discussion used an electronic control module to illustrate the method and apparatus of the present invention. The present invention is also applicable to other applications that use materials that are difficult to solder such as aluminum. The present invention is intended to be limited only by the scope and spirit of the following claims.

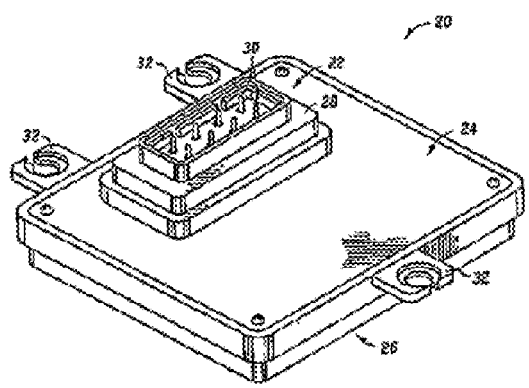

What is claimed is:

1. A method for securing a first aluminum piece to a second aluminum piece, the first aluminum piece is a metallic substrate and the second aluminum piece is a metallic housing, the method comprising the steps of:
   firing a first solderable coating to an edge of the first aluminum piece;
   firing a second solderable coating to a portion of the second aluminum piece;
   joining the first aluminum piece to the second aluminum piece to form a joint at the first solderable coating and the second solderable coating;
   applying a solder to the joint;
   solder bonding the first aluminum piece to the second aluminum piece to provide a hermetic seal at the joint.

2. The method of claim 1 wherein the step of firing the first solderable coating to the edge of the first aluminum piece includes firing a high temperature processed glass filled ink.

3. The method of claim 1 wherein the step of firing the second solderable coating to the portion of the second aluminum piece includes firing a high temperature processed glass filled ink.

4. The method of claim 1 wherein the step of applying the solder to the joint includes applying a solder paste.

5. The method of claim 4 wherein the step or solder bonding the first aluminum piece to the second aluminum piece includes reflowing the solder in a reflow oven.

6. The method of claim 1 further comprising the step of applying an electrically insulating layer to the first aluminum piece and the second aluminum piece prior to the step of firing a first solderable coating and firing a second solderable coating.

7. A method for securing a metallic substrate to a metallic housing, the method comprising the steps of:
   firing a first solderable coating to an edge of the metallic substrate;
   firing a second solderable coating to a groove of the metallic housing;
   joining the edge of the metallic substrate to the groove of the metallic housing to form a joint at the first solderable coating and the second solderable coating;
   applying a solder so joint;
   solder bonding the metallic substrate to the metallic housing to provide a hermetic seal at the joint.

8. The method of claim 7 wherein the metallic substrate and the metallic housing are made of aluminum.

9. A The method of claim 7 wherein the step of firing the first solderable coating to the edge of the metallic substrate includes firing a high temperature processed glass filled ink.

10. The method of claim 7 wherein the step of firing the second solderable coating to the groove of the metallic housing includes firing a high temperature processed glass filled ink.

11. The method of claim 7 wherein the step of applying the solder to the joint includes applying a solder paste.

12. The method of claim 11 wherein the step of solder bonding the metallic substrate to the metallic housing include reflowing the solder in a reflow oven.

13. The method of claim 7 further comprising the step of applying an electrically insulating layer to the metallic substrate and the metallic housing prior to the step of firing a first solderable coating and firing a second solderable coating.

* * * * *

UNITED STATES PATENT AND TRADEMARK OFFICE
CERTIFICATE OF CORRECTION

| | | |
|---|---|---|
| PATENT NO. | : 6,749,105 B2 | Page 1 of 8 |
| APPLICATION NO. | : 10/103590 | |
| DATED | : June 15, 2004 | |
| INVENTOR(S) | : Wang et al. | |

It is certified that error appears in the above-identified patent and that said Letters Patent is hereby corrected as shown below:

The title page showing an illustrative figure(s) 1 should be deleted and substitute therefore the attached title page consisting of Fig. 1.

The drawing sheets consisting of Fig(s) 1-6C should be deleted and substitute therefore the attached drawing sheets consisting of Fig(s) 1-6C.

Signed and Sealed this

Second Day of October, 2007

JON W. DUDAS
*Director of the United States Patent and Trademark Office*

United States Patent
Wang et al.

(10) Patent No.: US 6,749,105 B2
(45) Date of Patent: *Jun. 15, 2004

(54) METHOD AND APPARATUS FOR SECURING A METALLIC SUBSTRATE TO A METALLIC HOUSING

(75) Inventors: Ying Wang, Wheeling, IL (US); Thomas P. Gall, Northbrook, IL (US)

(73) Assignee: Motorola, Inc., Schaumburg, IL (US)

(*) Notice: Subject to any disclaimer, the term of this patent is extended or adjusted under 35 U.S.C. 154(b) by 28 days.

This patent is subject to a terminal disclaimer.

(21) Appl. No.: 10/103,590

(22) Filed: Mar. 21, 2002

(65) Prior Publication Data

US 2003/0178217 A1 Sep. 25, 2003

(51) Int. Cl.[7] .................. B23K 1/20; B23K 31/02; B23K 20/16; B23K 20/22; B23K 35/24
(52) U.S. Cl. .................. 228/262.51; 228/208; 228/245
(58) Field of Search .................. 228/262.1, 262.5–262.51, 228/124.6, 208, 245, 248.1

(56) References Cited

U.S. PATENT DOCUMENTS

| | | | |
|---|---|---|---|
| 3,586,926 A | * | 6/1971 | Nakamura et al. ........ 257/682 |
| 3,675,310 A | * | 7/1972 | Schwaneke et al. ...... 228/205 |
| 3,811,030 A | * | 5/1974 | Veach ....................... 219/237 |
| 3,855,679 A | * | 12/1974 | Schmutz ................... 428/643 |
| 4,082,394 A | | 4/1978 | Godney et al. |
| 4,338,486 A | * | 7/1982 | Mucke ...................... 174/52.5 |
| 4,434,134 A | | 2/1984 | Darrow et al. |
| 4,486,522 A | * | 12/1984 | Dathe et al. ............. 174/52.5 |
| 4,598,470 A | | 7/1986 | Dougherty, Jr. et al. |
| 4,784,974 A | * | 11/1988 | Butt ........................... 29/827 |
| 4,954,313 A | | 9/1990 | Lynch |
| 5,030,499 A | | 7/1991 | Shaheen et al. |
| 5,080,958 A | | 1/1992 | Patterson et al. |
| 5,101,322 A | | 3/1992 | Ghaem et al. |
| 5,123,164 A | | 6/1992 | Shaheen et al. |
| 5,155,299 A | * | 10/1992 | Mahulikar et al. ...... 174/52.4 |
| 5,170,245 A | | 12/1992 | Kim et al. |
| 5,216,581 A | | 6/1993 | Fisher et al. |
| 5,265,322 A | | 11/1993 | Fisher et al. |
| 5,315,155 A | * | 5/1994 | O'Donnelly et al. ........ 257/711 |
| 5,316,787 A | | 5/1994 | Frankeny et al. |
| 5,332,695 A | * | 7/1994 | Shigihara et al. ......... 438/122 |
| 5,435,480 A | | 7/1995 | Hart et al. |
| H1471 H | | 8/1995 | Braun et al. |
| 5,507,499 A | * | 4/1996 | Davenport et al. ......... 277/312 |
| 5,526,867 A | * | 6/1996 | Keck et al. ................. 164/97 |
| 5,640,761 A | | 6/1997 | DiStefano et al. |
| 5,671,802 A | * | 9/1997 | Rogers ....................... 165/41 |
| 5,708,566 A | * | 1/1998 | Hunninghaus et al. ...... 361/704 |
| 5,715,595 A | | 2/1998 | Kmon et al. |
| 5,894,054 A | | 4/1999 | Paruchuri et al. |
| 5,957,547 A | * | 9/1999 | Schlicke et al. ........ 303/119.3 |
| 6,037,539 A | | 3/2000 | Kilgo et al. |
| 6,114,098 A | | 9/2000 | Appelt et al. |
| 6,129,262 A | | 10/2000 | Cooper et al. |
| 6,244,497 B1 | | 6/2001 | Conn et al. |
| 6,264,096 B1 | | 7/2001 | Belt et al. |
| 6,449,158 B1 | * | 9/2002 | Wang et al. ............... 361/704 |
| 6,497,026 B1 | * | 12/2002 | Traver et al. ............. 29/402.08 |

FOREIGN PATENT DOCUMENTS

EP 0 411 551 A2 7/1990

* cited by examiner

Primary Examiner—Tom Dunn
Assistant Examiner—Colleen P. Cooke
(74) Attorney, Agent, or Firm—Thomas V. Miller

(57) ABSTRACT

A method for securing a metallic substrate (24) to a metallic housing (26). The method may include: firing a first solderable coating (64) to an edge (60) of the metallic substrate (24); firing a second solderable coating (64) to a groove (62) of the metallic housing (26); joining the edge (60) of the metallic substrate (24) to the groove (62) of the metallic housing (26) to form a joint (66) at the first solderable coating and the second solderable coating; applying a solder (68) to the joint (66); and solder bonding the metallic substrate (24) to the metallic housing (26) to provide a hermetic seal at the joint (66). There is also an electronic control module that incorporates the method.

13 Claims, 6 Drawing Sheets